United States Patent [19]

Raynor et al.

[11] 3,902,590

[45] Sept. 2, 1975

[54] ENDLESS VERTICAL CONVEYOR SYSTEM WITH GEAR POCKET CARRIER GUIDE

[75] Inventors: Warren S. Raynor, Ellwood City, Pa.; Jacob Hermans, Cobourg, Canada

[73] Assignee: Rexnord Inc., Milwaukee, Wis.

[22] Filed: Dec. 20, 1973

[21] Appl. No.: 426,753

[52] U.S. Cl. .................. 198/158; 187/3; 187/16; 198/137; 198/154; 198/208; 312/268
[51] Int. Cl.² ................. B65G 17/12; B65G 17/18
[58] Field of Search ........... 198/158, 154, 137, 208; 187/3; 312/268, 97

[56] References Cited
UNITED STATES PATENTS

| | | | |
|---|---|---|---|
| 832,986 | 10/1906 | Levalley | 198/158 |
| 2,370,546 | 2/1945 | Kiesling | 187/3 |
| 3,034,636 | 5/1962 | Manna | 198/158 |
| 3,363,742 | 1/1968 | Raynor | 198/38 |
| 3,365,052 | 1/1968 | Kornylak | 198/158 |

FOREIGN PATENTS OR APPLICATIONS
665,953    7/1963    Canada .............................. 198/158

*Primary Examiner*—Evon C. Blunk
*Assistant Examiner*—Jeffrey V. Nase
*Attorney, Agent, or Firm*—Sughrue, Rothwell, Mion, Zinn and Macpeak

[57] ABSTRACT

An endless vertical chain conveyor system of the type having tray carriers with guide wheels running in vertical tracks (e.g. U.S. Pat. No. 3,363,742) has a gear pocket carrier guide at the top and bottom curved sections of the conveyor. The chain sprocket at the top and at the bottom of the vertical conveyor has a planetary gear system which meshes with the carrier gear to maintain each carrier level. Guide wheels which support the cantilever load on each carrier operate in vertical tracks during vertical movement. The cantilever load is supported by a pocket guide for the carrier gear during movement around the top and bottom sprockets.

9 Claims, 12 Drawing Figures

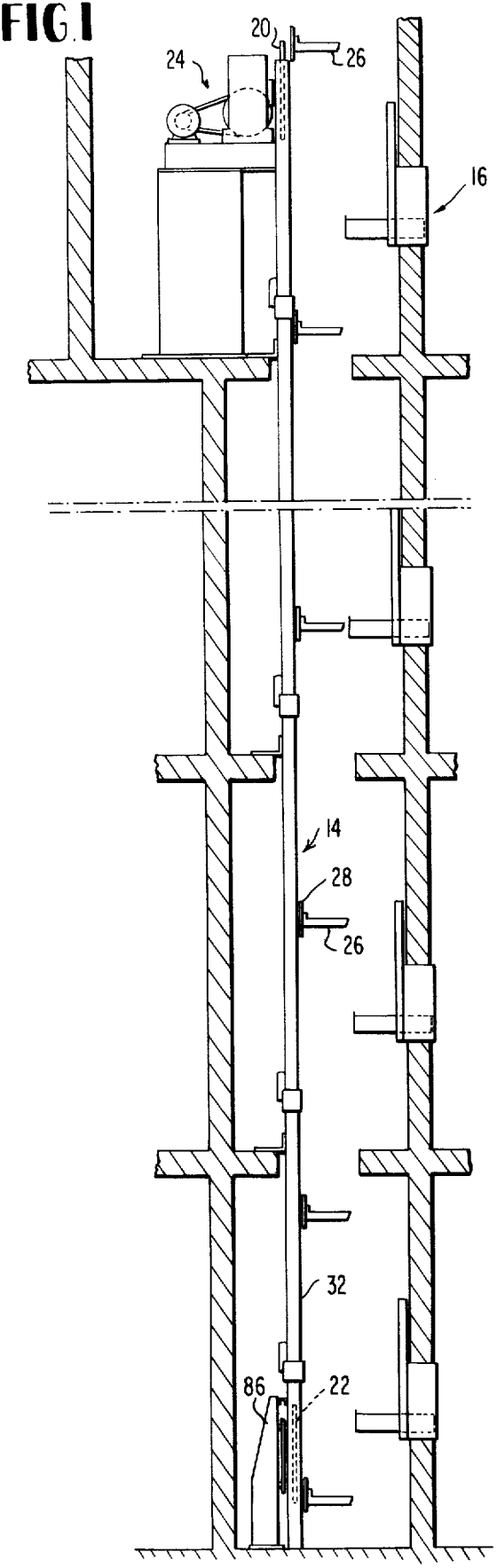
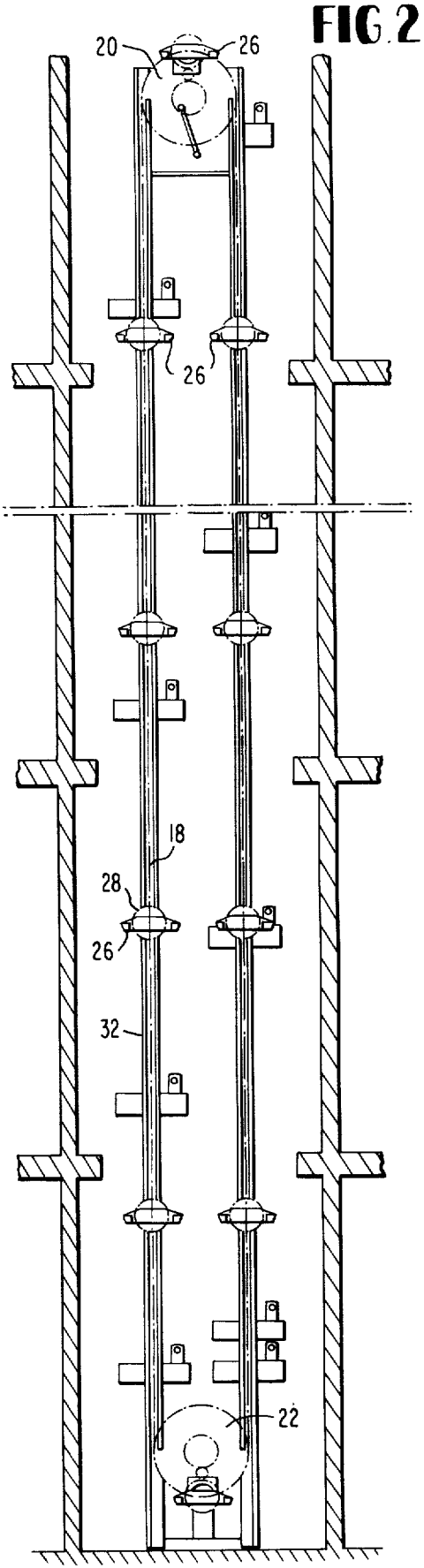

ENDLESS VERTICAL CONVEYOR SYSTEM WITH GEAR POCKET CARRIER GUIDE

BACKGROUND OF THE INVENTION

This invention relates to improvements in endless vertical selective delivery conveyors and particularly means for guiding the same and supporting cantilever load on carriers thereof, while the carriers are passing around the top and bottom sprockets.

In U.S. Pat. No. 3,363,742, assigned to the assignee of this invention, a selective delivery conveyor of the prior art is disclosed. Such conveyor includes an endless chain to which are attached a plurality of load carriers for movement between a number of loading and unloading stations along the vertical path of the conveyor. Each load carrier includes a load carrying tray extending to one side of the conveyor on which a load is supported. Obviously, a load on this tray of the load carrier places a cantilever load on the carrier and consequently applies forces to the carrier as it is guided during its movement. These forces are taken up and the carrier is positively guided during vertical movement by wheels running in a pair of opposite tracks, as shown for example in FIGS. 3 and 6 of the patent. As the load carriers turn the corners at the top and bottom of the conveyor, a planetary system of gearing meshing with a gear on the carrier keeps the carrier load horizontal and level. However, there is still the cantilever forces acting and these are, in the prior art patent, balanced or absorbed in further curved guides which are extensions of the vertical guides.

These curved guide sections above the top sprocket and below the lower sprocket are difficult to fabricate and must be carefully matched with the ends of the straight guide tracks. Moreover, these curved guides are not fully operative during chain adjustment and complicate any chain sprocket adjustment when the conveyor chain needs to be taken up. In other words, if the carrier is not positively guided to compensate for the cantilever load as it passes around the top and bottom sprockets, the cantilever load can swing within limits from side to side. Also, if either sprocket is moved relative to the other one, for example to adjust for chain tension, the corresponding curved guide sections must also be raised and lowered. This, in the prior art, has involved providing interchangeable sections of suitable length or extensible sections between the ends of the vertical tracks and the curved side plates.

SUMMARY OF THE INVENTION

In the environment of the prior art conveyor, as disclosed in the aforesaid patent, this invention provides improved stability of the load carrier and avoids take up difficulty as described above. This is accomplished by guiding and supporting the carrier to compensate for cantilever loads during movement around the upper and lower sprockets by means of a pocket for the carrier gear. The pocket is attached to the chain sprocket and embraces both sides of the carrier gear for this purpose.

Also, this invention provides ease of keeping the conveyor chain in adjustment by means of a downwardly adjustable lower sprocket assembly. The lower sprocket may be biased downwardly by gravity to provide constant tension on the conveyor chain.

BRIEF DESCRIPTION OF THE DRAWINGS

FIG. 1 is a schematic representation of a vertical conveyor system as installed in a multi-storied building;

FIG. 2 is a front view of the conveyor shown in FIG. 1;

DETAILED DESCRIPTION OF PREFERRED EMBODIMENT

Figure 3:
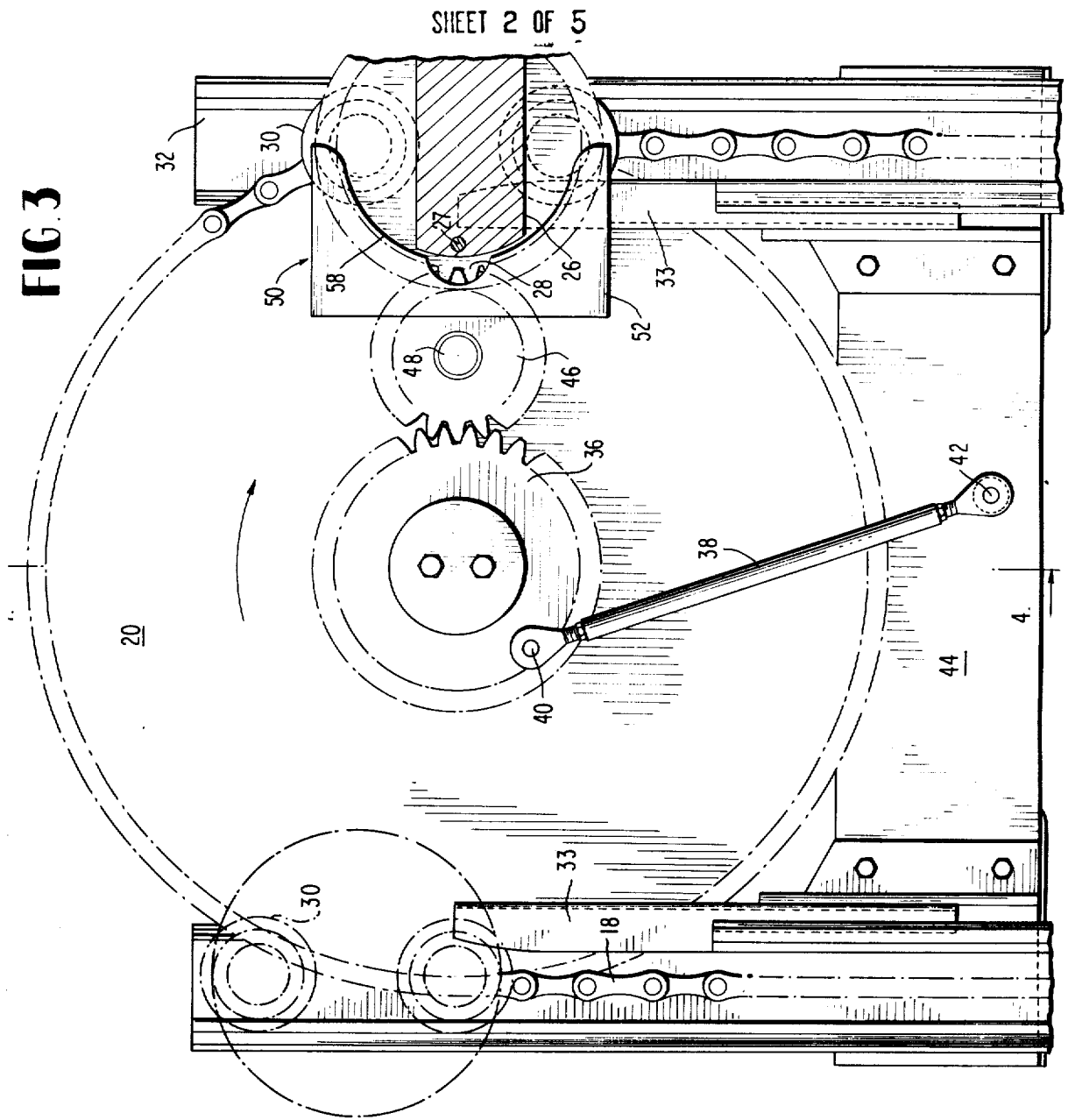
FIG. 3 is a detailed front elevation of the upper drive means including the sprocket and the gear pocket carrier guide of this invention.

In general the conveyor system of this invention is similar to that shown in U.S. Pat. No. 3,363,742. That is, a selective conveyor system 14 includes a plurality of load and unload stations 16 which it traverses. The conveyor includes a double pitched roller chain 18 trained around an upper drive sprocket 20 and an identical lower sprocket 22. Drive means 24 is provided for driving the conveyor. Along the length of the conveyor, there is a plurality of carriers 26 extending from one side of the conveyor for carrying a load to the various load and unload stations 16. The carrier 26 is secured by bolts 27 to a carrier gear 28, which is provided with upper and lower guide wheels 30, see for example FIG. 3. During vertical movement of the carriers, the guide wheels 30 are guided in vertical guide tracks 32. The wheels 30 are vertically spaced so that the tracks also support the carrier against cantilever loads to prevent the outer end of the carrier from dipping downwardly and causing problems with the drive of the chain, etc. The tracks are generally like that of prior U.S. Pat. No. 3,363,742.

However, the vertically spaced wheels 30 are not guided as the carrier 26 moves around the upper periphery of sprocket 20. To allow wheels 30 to exit the track 32 at the left and enter the track 32 at the right of the conveyor as shown in FIG. 3, the inner sections of tracks 32 are cut away at their upper ends as shown in FIG. 3 and are provided with the flat tips 33 having partially curved edges to accommodate the lower wheel 30 guiding the carrier 26. Chain 18 is of a length which is a multiple of the periphery of sprocket 20 or 22 and the carriers 26 are equally spaced a distance which is similarly a number of times the periphery of sprocket 20 or 22. Each carrier 26 is driven by a pin which projects from chain 18 and is turnable in the hub of gear 28.

Figure 4:
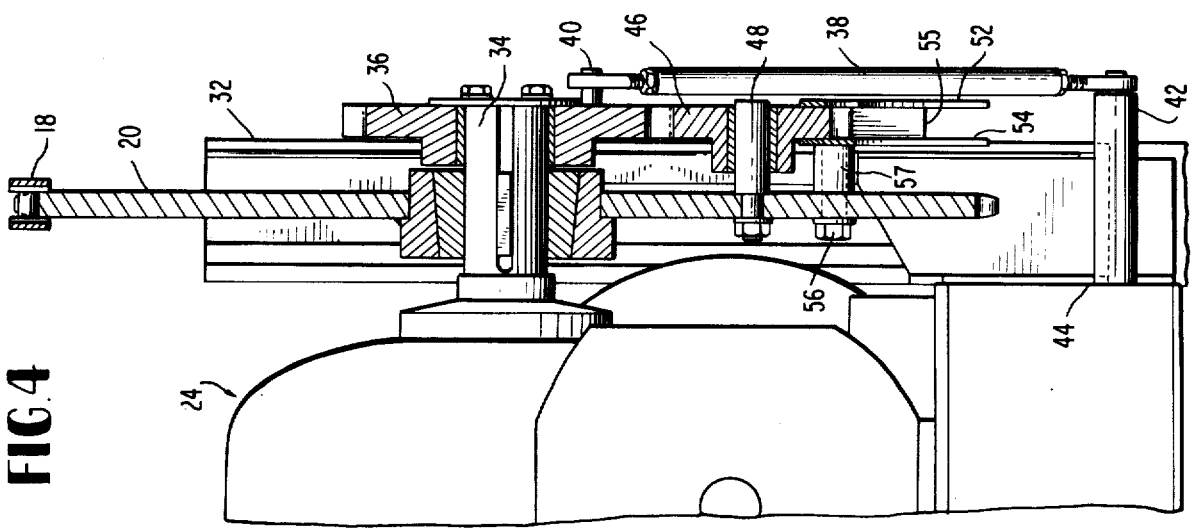
FIG. 4 is a sectional view taken along line 4—4 of FIG. 3 showing the pocket in its lowermost position.
Figure 5:
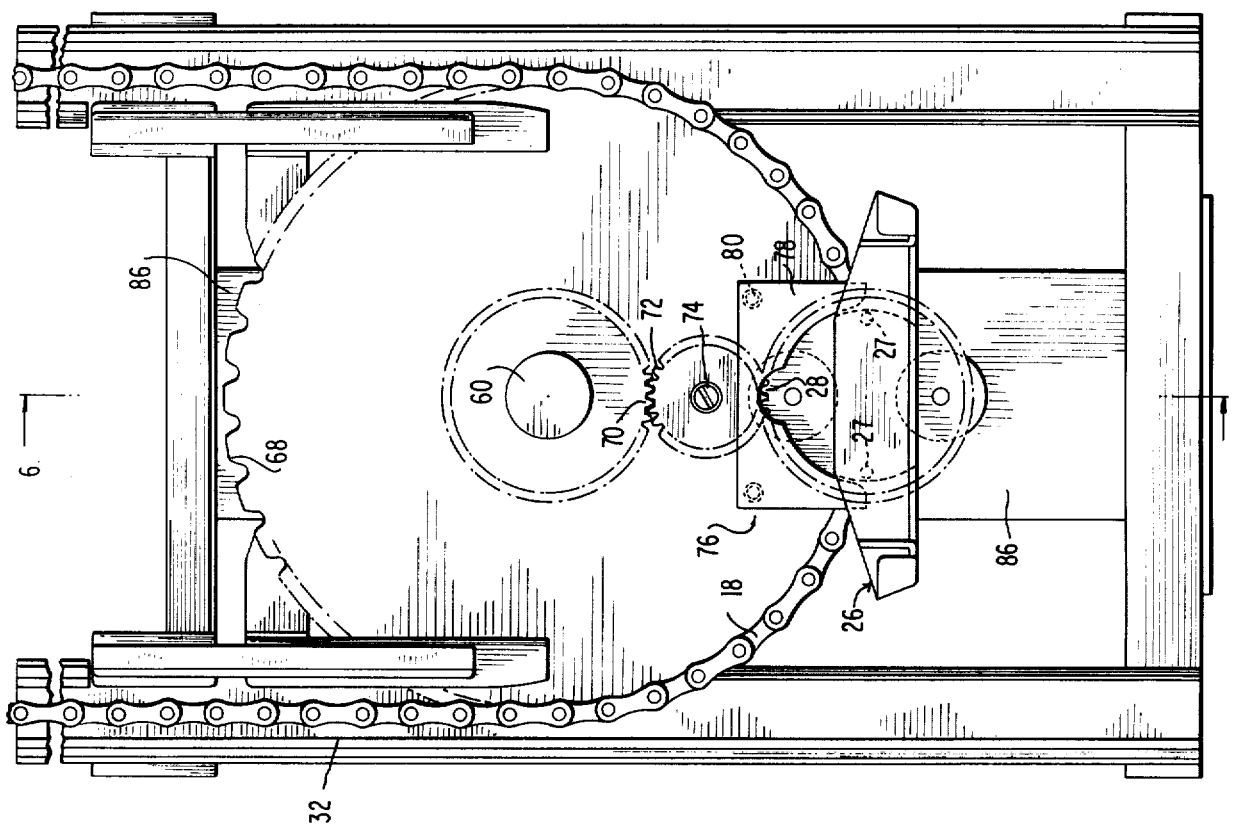
FIG. 5 is a front elevation of the lower sprocket assembly showing the gear pocket carrier guide.
Figure 6:
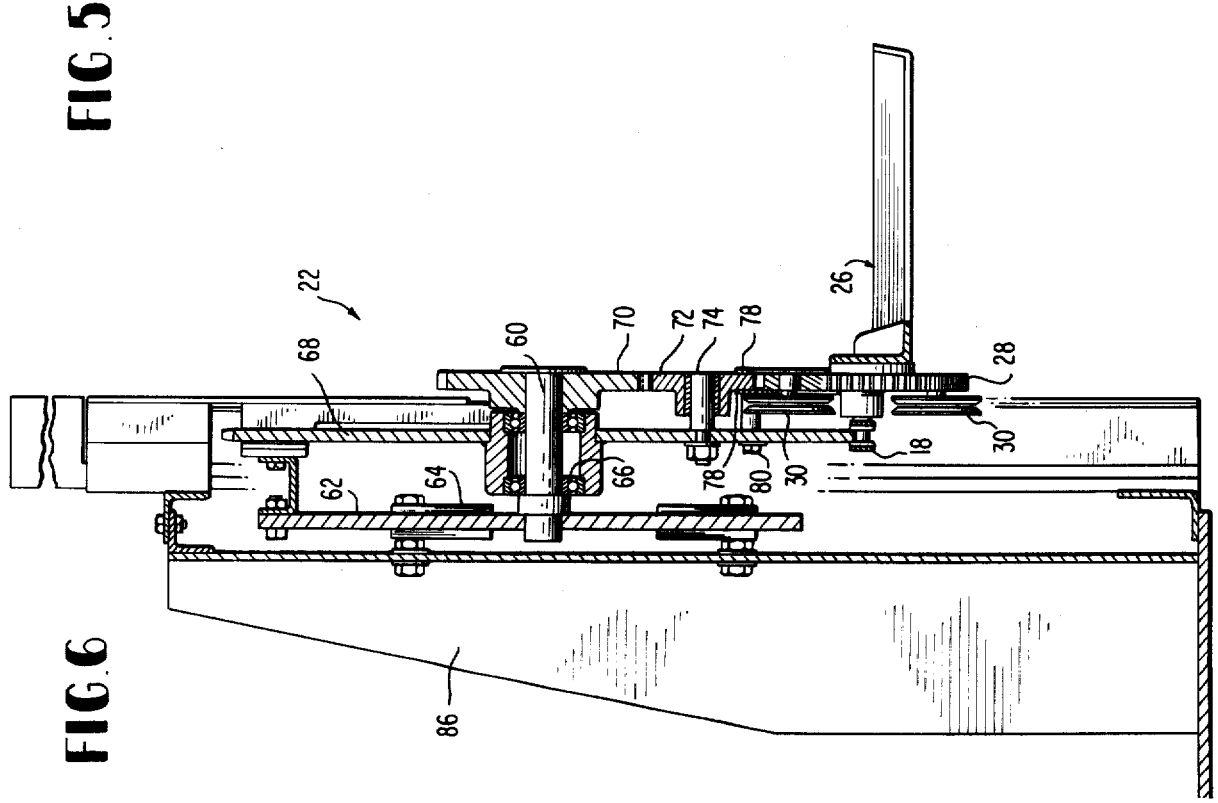
FIG. 6 is a sectional view taken along line 6—6 of FIG. 5.

The drive means 24, as shown in FIGS. 3 and 4, includes a drive shaft 34 keyed to a hub to drive sprocket 20 around which chain 18 is trained. A planetary sun gear 36 is positioned at the outer end of shaft 34 and is held in an adjustable stationary position by adjustable tie rod 38 having one end secured to a post 40 extending from gear 36 and the other end secured to post 42, extending into stationary support 44. An idler planet gear 46 is freely rotatable on stub shaft 48 which is secured to sprocket 20. Planet gear 46 meshes with the teeth of sun gear 36 and with the teeth of carrier gear 28. By this planetary system, the load tray of carrier 26 is kept vertical during passage around the top of the conveyor. A planetary system is also shown in prior U.S. Pat. No. 3,363,742 and other planetary systems, for example using a chain, could also be used to keep the carrier level.

As has been mentioned, the vertical guide tracks 32 terminate and there are no guides for the wheels 30 as the carrier 26 goes around the top of sprocket 20. Accordingly, if there were no means to hold back the carrier, the cantilever load thereon would be imposed on chain 18. This invention includes a gear pocket 50 for the carrier gear 28 to restrain the carrier gear 28 and keep it in a vertical plane even with the cantilever loads and without a curved guide around the top of the sprocket 20. The gear pocket 50 is a welded, rigid assembly comprising a pair of spaced plates 52, 54 separated by a spacer block 55 and is attached by bolts 56 to the upper sprocket 20 and spaced by the bushings 57 in a position adjacent the idler 46 as shown in FIG. 3. The plates 52 have a cut out portion 58 for clearance, but overlie a portion of the periphery of both faces of carrier gear 28 so as to hold this gear in a vertical plane as the carrier moves around the top of the conveyor.

The lower sprocket 22 turns on an idler stub shaft 60 rigidly secured to a sprocket shaft mounting plate 62 which is vertically slideable within guide straps 64. Bearings 66 on shaft 62 rotatably support a lower sprocket gear 68 for idling movement. A planetary system including a stationary sun gear 70 and an idler planet gear 72 turnable on shaft 74 is provided for the carrier gear 28 as described in connection with the sprocket 20. Again, gear 28 meshes with planet idler 72 which meshes with stationary sun gear 70 to maintain the carrier tray 26 horizontally level during passage around the bottom of the conveyor.

Figure 7:
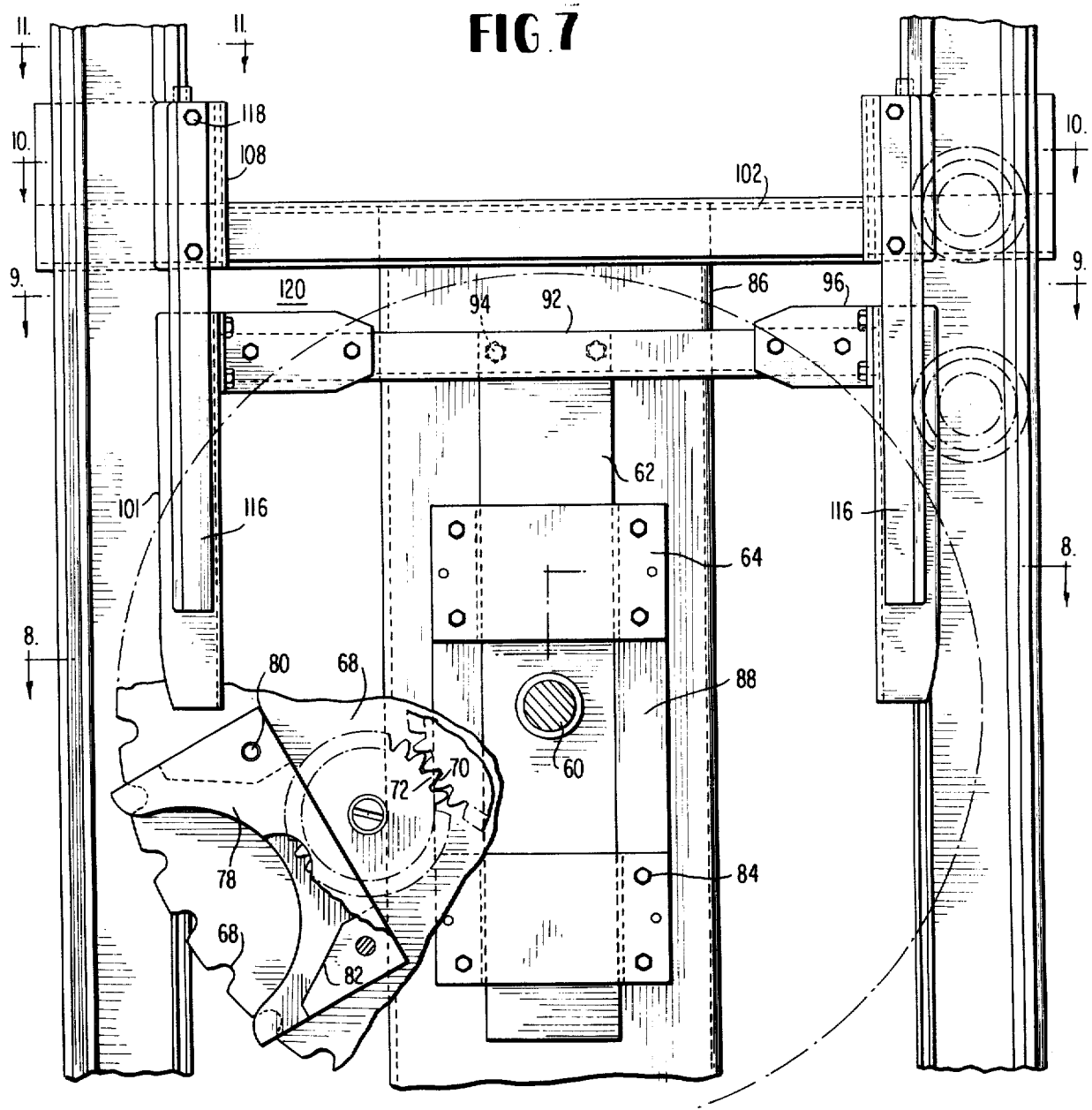
FIG. 7 is an enlarged front elevation, parts of the lower sprocket assembly with the chain and carrier removed.

Again, there is a gear pocket carrier and guide 76 formed similarly to pocket 50 with a pair of plates 78 on mounting posts 80 secured to the sprocket 68. The plates embrace both faces of the carrier gear 28 in mesh with the idler 72 to restrain it from movement out of a vertical plane. FIG. 7 also shows the details of the pocket 76 including the cut out plates 78, mounting posts 80 and spacer blocks 82. As is evident, each gear pocket is open in a direction radial of the sprocket to accommodate meshing of the carrier gear 28 with the idler.

Figure 8:
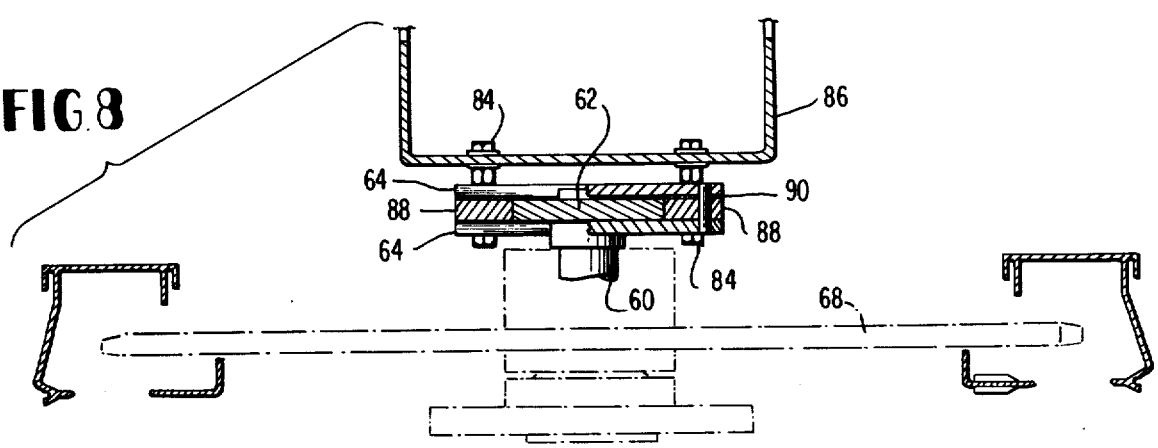
FIG. 8 is a sectional view taken along line 8—8 of FIG. 7.

The stub shaft 60 on shaft mounting plate 62 is vertically movable under the weight of the assembly for adjustment by means of plate 62 sliding vertically within guide 64 which is secured by bolts and nuts 84 to a vertical support 86. Spacer bars 88 are sandwiched by the two pairs of straps 64 and the space therebetween provides an enclosed track for the sliding of plate 62, see FIGS. 7 and 8. Additionally, shims 90 may be positioned between the straps 64 and bars 88 to adjust the depth of the sliding space for plate 62.

Figure 9:
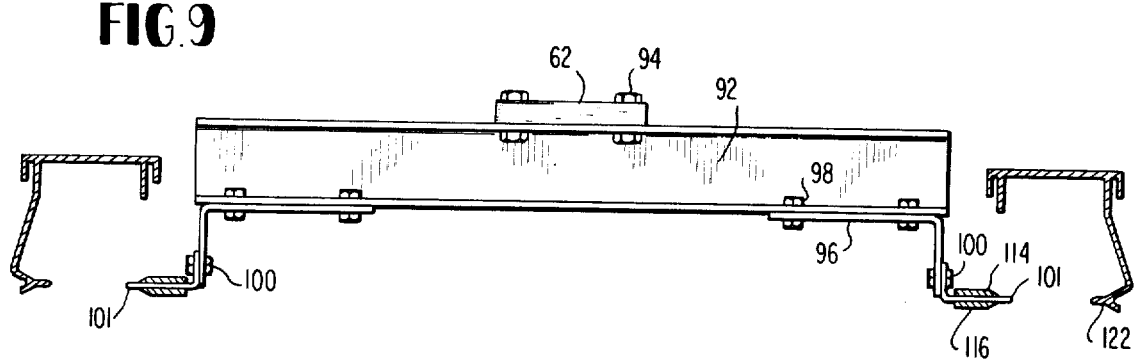
FIG. 9 is a sectional view taken along line 9—9 of FIG. 7.

The top of plate 62 is secured to a cross member 92, see FIGS. 7 and 9, by suitable bolts and nuts 94. On the other side of cross member 92 there is a pair of angles 96 secured to the ends of the cross member by suitable means such as bolts 98. Additional bolts 100 secure an angle guide tip 101 which functions as an inside guide for wheels 30 at the lower end of each track in a manner similar to tips 33 except that the tips 101 must move with sprocket 68 as the latter moves downwardly for take up.

Figure 10:
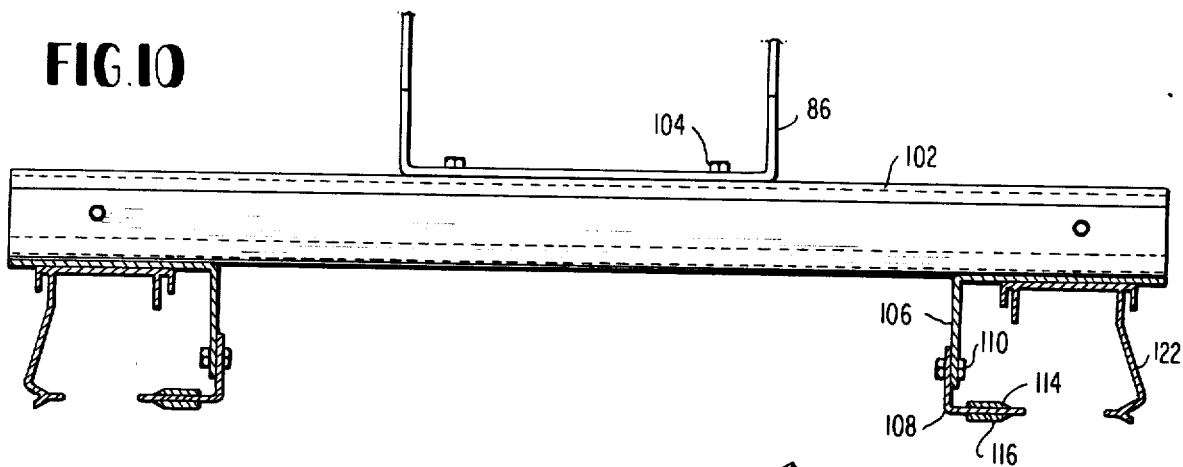
FIG. 10 is a sectional view taken along line 10—10 of FIG. 7.
Figure 11:
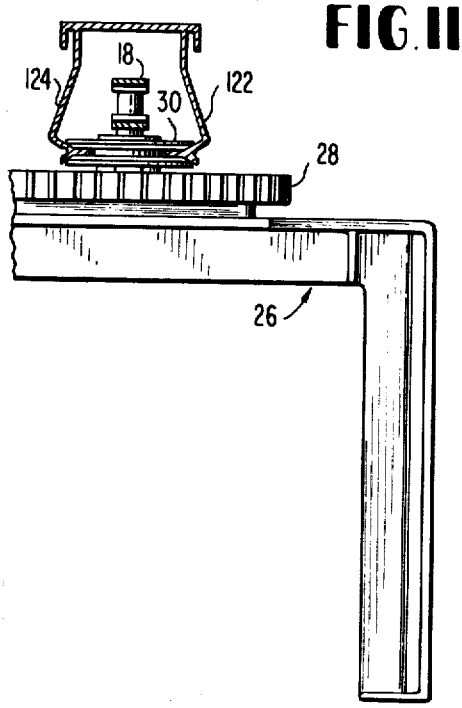
FIG. 11 is a sectional view taken along line 11—11 of FIG. 7.
Figure 12:
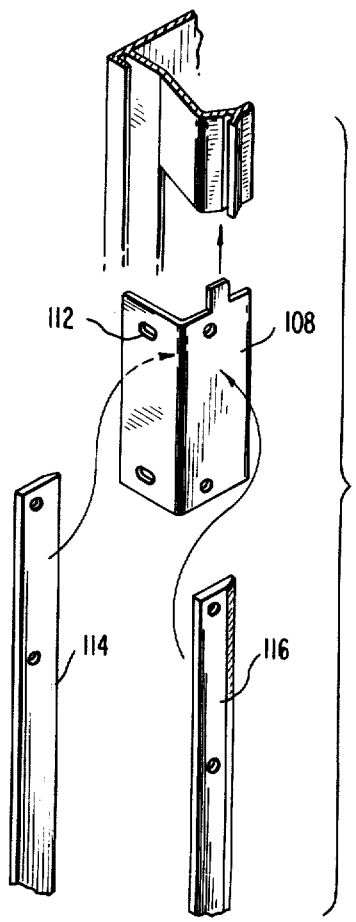
FIG. 12 is an exploded perspective view of a portion of the assembly for an inner guide rail shown in FIGS. 7, 9 and 10.

As shown in FIGS. 7 and 10, a stationary support cross member 102 is attached by bolts 104 to vertical support frame 86. The vertical guide tracks 32 include spaced Y-shaped sections for guiding wheels 30 therebetween as shown in FIG. 11, and the tracks are also box-like members to enclose the inner guide 124. Outer guide 122 is also shown in FIGS. 9 and 10, where the vertical runs of chain 18 between upper and lower sprockets 20 and 68. The guides for guiding the wheels 30 at the level of section line 10—10 are outer stationary guides 122 and inner guides formed from angles 106 and 108, bolted together by bolts 110 through a slotted arrangement 112, see FIG. 12. Guide bars 114 and 116 are attached to the sides of one portion of angle 108 by bolts 118 as shown in FIG. 12 to function as the sides of the inner Y-shaped guide; these guides are also shown in FIGS. 7, 8, 9 and 10. They, of course, are stationary and they sandwich the movable guide tip 101 which moves downwardly with sprocket 68 when the latter moves downwardly for chain take-up. Such take-up is shown by the space between the upper ends of the guide tips 101 and angles 108. Guide tips 101, cross member 92, plate 62, shaft 60, sprocket 68, pocket 76 and the planetary system are all mounted for downward movement so that the weight of this assembly may apply a constant tension to the chain and eliminates need for adjustment of chain tension.

It is seen that the foregoing arrangement as disclosed provides a unique means for maintaining a carrier gear in a vertical plane during its movement around top and bottom sprockets in this system. It also provides for a unique floating, self-adjusting means for the lower chain sprocket.

We claim:

1. In a conveyor system of the type including: a vertically movable conveyor, a chain extending around upper and lower sprockets for moving the conveyor, means for driving the conveyor through the upper sprocket, a plurality of carriers mounted on the conveyor chain and extending from one side of the conveyor, the carriers being movable with the conveyor to a plurality of loading and unloading stations, a pair of guide wheels attached to each carrier for guiding the same along a vertical path of the conveyor and maintaining the carriers at the same attitude during vertical movement, pairs of vertical guides cooperating with the guide wheels on the vertical runs of the conveyor also acting to prevent a cantilever load on the carriers from applying a force to pull the chain from its normal path, a carrier gear attached to each carrier a having face sides plus teeth to mesh with a planetary system which includes a sun gear and an idling planet gear on each sprocket to maintain the carrier's attitude during movement around the sprockets, the improvements in means for supporting the cantilever load on the carriers during movement of the carrier gear around the sprockets while maintaining the carrier attitude, comprising: a gear pocket contoured to closely receive a peripheral portion of the carrier gear, the gear pocket carried by and rigid with each sprocket and being open in a radial direction to receive the carrier gear as it moves into the planetary system of each sprocket and carry the carrier gear while in the planetary system and to accommodate the idling planet gear meshing with the carrier gear to maintain the carrier attitude during movement around the sprocket, the gear pocket shaped to embrace a substantial portion of the total periphery of the face sides of the carrier gear of each carrier as it meshes with the planetary system to provide support for the cantilever load as the load moves around the sprocket.

2. A conveyor system as in claim 1 wherein the gear pocket comprises spaced plates shaped to embrace about half the gear teeth of the carrier gear, the plates separated by spacer blocks and mounted on studs extending from the sprockets.

3. A conveyor system as in claim 1 wherein the planetary system includes a stationary sun gear and an idling planet gear, and the gear pocket is adjacent the idling planet gear of the planetary system.

4. A conveyor system as defined in claim 1, further comprising means mounting the lower sprocket and gear pocket carried thereby for vertical floating movement.

5. A conveyor system as defined in claim 4 wherein a portion of the lower ends of the vertical guides is movable downwardly with the lower sprocket and gear pocket.

6. A conveyor system as defined in claim 5 wherein the guides are Y-shaped in section, and the guide wheels have complementary grooves therein.

7. A conveyor system as defined in claim 6 wherein the planetary system includes a stationary sun gear and an idling planet gear, and the vertical guides include guide rails with lower ends having inner guide rails, the lower sprocket, planet gear, gear pocket and lower ends of the inner guide rails are slideably movable vertically.

8. A conveyor system as defined in claim 7 wherein there is a box-like guide for a sprocket shaft mount to allow the slideable vertical movement and further comprising shim means for adjusting the space for sliding movement of the sprocket shaft mount.

9. A conveyor system as defined in claim 8 wherein the lower ends of the inner guide rails are sandwiched between stationary vertically depending slide bars positioned and shaped to the sides of the Y-shaped section of these ends.

* * * * *